Patented Dec. 7, 1943

2,335,959

UNITED STATES PATENT OFFICE 2,335,959

COMPOSITE PROTECTIVE COATING

Harold K. Patch, Hermosa Beach, Calif., assignor to Crossfield Products Corp., Los Angeles, Calif., a corporation of California No Drawing. Application February 26, 1942, Serial No. 432,452

16 Claims. (Cl. 117—77)

This invention relates to protective coatings. More particularly it relates to coatings for decks of ships, floors and the like.

Some of the objects of the invention are to provide novel coatings in which a bonding coating is first applied to the deck in one or more coats by brushing, spraying, or troweling, such bonding coating being composed of an aqueous dispersion of natural or synthetic rubber, a dehydrating agent, and, in some cases, a filler or aggregate; and, after the bonding coating has been applied, but before it has dried or set, a surface or outer coating of magnesite composition is applied. The invention includes such coatings and the methods of making or applying them.

Other objects and advantages of my invention will appear to those skilled in the art upon reading the following description of the invention and of the manner of making, constructing, compounding, and using it, and I shall also set forth what I now consider the best ingredients and methods for carrying my invention into practice.

In carrying out my invention, I provide a bonding material containing: (1) an aqueous dispersion of natural or synthetic rubber, such as normal or concentrated rubber latex, preferably the latter; (2) a dehydrating agent, such as, preferably, aluminous cement; and, in some cases, (3) an aggregate or filler such as pumice, walnut shells ground to a screen size of about from 8 to 20 mesh, cork, sawdust, or granite. Dependent upon its composition, the conditions of use, etc., the bonding material is sprayed, brushed, or trowelled onto the deck, after the latter has been freed of grease and scale.

After the desired thickness of bonding material has been applied to the deck, and while the applied material is still wet and has not set, the magnesite composition is applied on top of the bonding material, as by troweling. Magnesite compositions are in common use as deck materials, having been applied to decks over cleats or mechanical bonding devices. A satisfactory magnesite composition for my purposes consists of 1¼ parts by weight of magnesite (calcined magnesium carbonate); ¾ part by weight of magnesium chloride; and 1¼ parts by weight of a suitable filler.

As specific examples for practicing my invention, I shall now set forth two satisfactory bonding materials.

Example I

Parts by weight

Concentrated rubber latex_____ 1
Aluminous cement_____ ½ to ¾

Example II

Parts by weight

Normal rubber latex_____ 1
Aluminous cement_____ 1¼ to 1½

Either of these two bonding materials is mixed to form a paint which is applied to the deck by brushing or spraying it on. Preferably, a second coat of the same material is similarly applied after the first coat has set only sufficiently to allow workmen to walk across it, which may take from one-half to five hours depending upon the drying conditions. While the top coat of bonding material is still wet, a finish coat of magnesite composition is applied to the thickness desired, say ⅜ inch.

Among other advantages of my invention, it will be found that a comparatively thin coating of magnesite composition may be employed, effecting a great saving in weight, which is particularly important on ship-board; the bonding material provides a complete bond between the steel and the magnesite composition and eliminates the need for clips or wire laths previously commonly employed; the bonding material furnishes a protective coating to the steel from the corrosive action of the chloride in the magnesite composition; the cracking of the magnesite composition, upon expansion and contraction of the steel deck, is minimized.

As additional examples of the bonding material that may be employed, I give the following.

Example III

Parts by weight

Concentrated rubber latex_____ 1
Aluminous cement_____ ¾
Pumice _____ 1

Example IV

Parts by weight

Normal rubber latex_____ 1
Aluminous cement_____ 1¼
Pumice _____ 1¼

Either of these two materials, after thorough mixing, may be trowelled upon the deck to a desired thickness, say ¼ inch average, and while still wet, a finish coat of magnesite composition is applied. The coating of magnesite composition may vary in thickness from ⅛ to ¼ inch.

Coatings employing bonding materials according to Examples III and IV have the same advantageous features of those employing bonding materials according to Examples I and II, but are even lighter in weight.

What is claimed is:

1. The method of coating a deck which comprises coating with a bonding mixture containing an aqueous dispersion of rubber and a dehydrating agent, and thereafter coating the mixture, before it has become set, with a settable magnesite composition.

2. The method of coating a deck which comprises coating with a bonding mixture containing rubber latex and aluminous cement, and thereafter coating the mixture, before it has become set, with a settable magnesite composition.

3. The method of coating a deck which comprises coating with a bonding mixture containing concentrated rubber latex and aluminous cement, and thereafter coating the mixture, before it has become set, with a settable magnesite composition.

4. The method of coating a deck which comprises coating with a bonding mixture containing an aqueous dispersion of rubber, a dehydrating agent, and an aggregate, and thereafter coating the mixture, before it has become set, with a settable magnesite composition.

5. The method of coating a deck which comprises coating with a bonding mixture containing one part by weight of concentrated rubber latex and ½ to ¾ parts of aluminous cement, and thereafter coating the mixture, before it has become set, with a settable magnesite composition.

6. The method of coating a deck which comprises coating with a bonding mixture containing one part by weight of normal rubber latex and 1¼ to 1½ parts by weight of aluminous cement, and thereafter coating the mixture, before it has become set, with a settable magnesite composition.

7. The method of coating a deck which comprises coating with a bonding mixture containing one part by weight of concentrated rubber latex, ¾ parts by weight of aluminous cement, and one part by weight of pumice, and thereafter coating the mixture, before it has become set, with a settable magnesite composition.

8. The method of coating a deck which comprises coating with a bonding mixture containing one part by weight of normal rubber latex, 1¼ parts by weight of aluminous cement, and 1¼ parts by weight of pumice, and thereafter coating the mixture, before it has become set, with a settable magnesite composition.

9. The combination with a deck of a deck coating comprising a magnesite composition set in situ and bonded to the deck by an intermediate coating containing, prior to application, an aqueous dispersion of rubber and a dehydrating agent.

10. The combination with a deck of a deck coating comprising a magnesite composition set in situ and bonded to the deck by an intermediate coating containing, prior to application, rubber latex and aluminous cement.

11. The combination with a deck of a deck coating comprising a magnesite composition set in situ and bonded to the deck by an intermediate coating containing, prior to application, an aqueous dispersion of rubber, a dehydrating agent, and an aggregate.

12. The combination with a deck of a deck coating comprising a magnesite composition set in situ and bonded to the deck by an intermediate coating containing, prior to application, an aqueous dispersion of rubber, a dehydrating agent, and an aggregate, the thickness of the intermediate coating being about ¼ inches, and the thickness of the coating of magnesite composition being from ⅛ to ¼ inches.

13. The combination with a deck of a deck coating comprising a magnesite composition set in situ and bonded to the deck by an intermediate coating containing, prior to application, 1 part by weight of concentrated rubber latex, and ½ to ¾ parts of aluminous cement.

14. The combination with a deck of a deck coating comprising a magnesite composition set in situ and bonded to the deck by an intermediate coating containing, prior to application, 1 part by weight of normal rubber latex, 1¼ to 1½ parts of aluminous cement.

15. The combination with a deck of a deck coating comprising a magnesite composition set in situ and bonded to the deck by an intermediate coating containging, prior to application, 1 part by weight of concentrated rubber latex, ¾ parts by weight of aluminous cement, and 1 part by weight of pumice.

16. The combination with a deck of a deck coating comprising a magnesite composition set in situ and bonded to the deck by an intermediate coating containing, prior to application, 1 part by weight of normal rubber latex, 1¼ parts by weight of aluminous cement, and 1¼ parts by weight of pumice.

HAROLD K. PATCH.